(12) United States Patent
Koifman et al.

(10) Patent No.: US 8,184,173 B1
(45) Date of Patent: May 22, 2012

(54) METHOD AND DEVICE FOR READING A PIXEL

(75) Inventors: Vladimir Koifman, Rishon Lezion (IL); Dmitry Pudnik, Ashkelon (IL); Itai Mar-Or, Nahariya (IL); Chen Bankirer, Ramat Gan (IL)

(73) Assignee: Pixim Israel Ltd., Ra'Anana, IL (US)

( * ) Notice: Subject to any disclaimer, the term of this patent is extended or adjusted under 35 U.S.C. 154(b) by 1140 days.

(21) Appl. No.: 11/877,724

(22) Filed: Oct. 24, 2007

Related U.S. Application Data

(60) Provisional application No. 60/914,769, filed on Apr. 30, 2007.

(51) Int. Cl.
*H04N 5/228* (2006.01)

(52) U.S. Cl. ............... 348/222.1; 348/223.1; 348/224.1; 348/225.1; 348/226.1; 348/227.1

(58) Field of Classification Search ............... 348/222.1, 348/223.1, 224.1, 225.1, 226.1, 227.1; 382/167
See application file for complete search history.

(56) References Cited

U.S. PATENT DOCUMENTS

| | | | | |
|---|---|---|---|---|
| 5,053,876 A | * | 10/1991 | Blissett et al. | 348/208.14 |
| 5,313,296 A | * | 5/1994 | Ohki | 348/208.1 |
| 2007/0189604 A1 | * | 8/2007 | Baron et al. | 382/167 |
| 2008/0158398 A1 | * | 7/2008 | Yaffe et al. | 348/294 |

* cited by examiner

*Primary Examiner* — Sinh Tran
*Assistant Examiner* — Selam Gebriel
(74) *Attorney, Agent, or Firm* — Reches Patents

(57) ABSTRACT

A method for reading a pixel, the method includes: (i) generating a first signal responsive to light sensed by the pixel during a first exposure period; (ii) comparing a first threshold to a first value of the first signal; (iii) writing a second value to the pixel; wherein the second value equals the first threshold if the first value exceeds the first threshold; wherein the second value equals the first value is the first signal is below the first threshold; (iv) generating a third signal responsive to the second value and to light sensed by the pixel during a second exposure period; (v) reading the third signal; and (vi) calculating a digital detection signal in response to a value of the third signal and in response to a first threshold.

9 Claims, 12 Drawing Sheets

METHOD AND DEVICE FOR READING A PIXEL

RELATED APPLICATIONS

This application claims priority from U.S. provisional patent Ser. No. 60/914,769 titled "High Dynamic Range Capturing", filing date 30 Apr. 2007.

FIELD OF THE INVENTION

The invention relates to a method and device for reading a pixel and especially for expanding the dynamic range of a pixel.

BACKGROUND OF THE INVENTION

Digital cameras include a two-dimensional pixel array. Each pixel includes a light sensitive element that converts photons to an analog signal. The light sensitive elements can include photodiodes, phototransistors, photo-gates, hole accumulation diodes, pinned diodes, avalanche diodes, buried accumulation and transfer layer devices.

Various prior art pixels are known. The most commonly used pixels are either CCD pixels or CMOS pixels.

Each pixel provides an analog signal in response to light that interacts with the light sensitive element.

A pixel has a dynamic range. The dynamic range is defined by a maximal detection signal and a minimal detection signal. In various applications there is a need to expand the dynamic range of the pixels.

There is a need to provide efficient methods and devices for reading a pixel and thereby expanding the dynamic range of the pixel.

SUMMARY OF THE INVENTION

A method for reading a pixel is provided. The method includes: generating a first signal responsive to light sensed by the pixel during a first exposure period; writing a second value to the pixel by utilizing an analog feedback circuit that includes an analog memory cell; wherein the second value is responsive to a value of the first signal and to an analog writing process threshold that is characteristic of the writing; generating a third signal responsive to the second value and to light sensed by the pixel during a second exposure period; reading a third value of the third signal; writing a fourth value to the pixel by utilizing the analog feedback circuit; wherein the fourth value is responsive to third value and to the analog writing process threshold; reading the fourth value; and calculating a digital detection signal.

A device is provided. The device includes a pixel, a readout circuit and an analog feedback circuit; wherein the analog feedback circuit includes an analog memory cell; wherein the pixel generates a first signal responsive to light sensed by the pixel during a first exposure period; wherein the analog feedback circuit writes a second value to the pixel; wherein the second value is responsive to a first value of the first signal and to an analog writing process threshold that is characteristic of a writing of the second value; wherein the pixel generates a third signal responsive to the second value and to light sensed by the pixel during a second exposure period; wherein the readout circuit reads a third value of the third signal; wherein the analog feedback circuits writes a fourth value to the pixel; wherein the fourth value is responsive to the third value and to the analog writing process threshold; wherein the readout circuits reads the fourth value; and wherein a calculator coupled to the readout circuit calculates a digital detection signal in response to the third value and to the fourth value.

A method for reading a pixel is provided. The method includes: generating a first signal responsive to light sensed by the pixel during a first exposure period; comparing a first threshold to a first value of the first signal; writing a second value to the pixel; wherein the second value equals the first threshold if the first value exceeds the first threshold; wherein the second value equals the first value is the first signal is below the first threshold; generating a third signal responsive to the second value and to light sensed by the pixel during a second exposure period; reading a third value of the third signal; and calculating a digital detection signal in response to the third value and in response to a first threshold.

A device is provided. The device includes a pixel, a readout circuit, an analog memory cell, a comparator and a write circuit; wherein the pixel generates a first signal responsive to light sensed by the pixel during a first exposure period; wherein the comparator compares a first value of the first signal to a first threshold; wherein the write circuit writes a second value to the pixel; wherein the second value equals the first threshold if the first value exceeds the first threshold; wherein the second value equals the first value is the first signal is below the first threshold; wherein the pixel generates a third signal responsive to the second value and to light sensed by the pixel during a second exposure period; wherein the readout circuit reads a third value of the third signal; and wherein a calculator calculates a digital detection signal in response to a the third value and the first threshold.

BRIEF DESCRIPTION OF THE DRAWINGS

The present invention will be understood and appreciated more fully from the following detailed description taken in conjunction with the drawings in which:

FIGS. 1-3 and 12 are schematic diagrams of devices according to various embodiments of the invention;

DETAILED DESCRIPTION OF THE DRAWINGS

The terms "signal" and "value" are used in a synonymous manner. A certain signal or value can be read from a pixel, written to a pixel, written to an analog memory cell, read from an analog memory cell, and the like. A certain signal can have (or can represent) a certain value. A first signal can have a first value, and the like. In various locations in the application a signal means a value of a signal and vice verse. It is further noted that the terms 'first', 'second', 'third', and 'fourth' are used to differentiate between signals, values or transistors.

A dynamic range of a pixel can be extended by exposing the pixel to light during consecutive exposure periods and applying either a comparison based algorithm or a double write back algorithm. Both algorithms use an analog feedback circuit that includes an analog memory cell.

The double write back algorithm involves performing two write back operations regardless of a value of the pixel after the first exposure period. The comparison based algorithm performs an analog clipping operation that is responsive to a relationship between a value of the pixel after the first exposure period and a threshold.

Both algorithms are conveniently implemented in devices that include a two dimensional array of pixels. The analog clipping and/or feedback are executed by analog circuits that are shared by pixel columns, thus eliminating mismatch problems associated with selective reset of each pixel.

The dynamic range of a pixel is expanded by clipping pixel values in case that these values exceed a threshold and reconstructing the pixel values after two exposure periods despite the clipping.

Figure 7A:
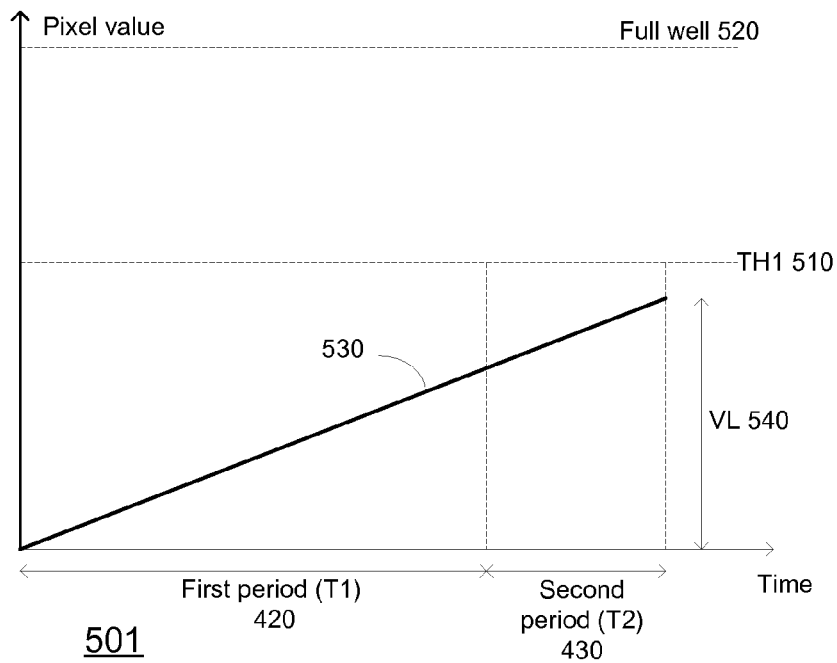
FIGS. 7A-7C illustrate pixel values during two exposure periods according to various embodiments of the invention.
Figure 7B:
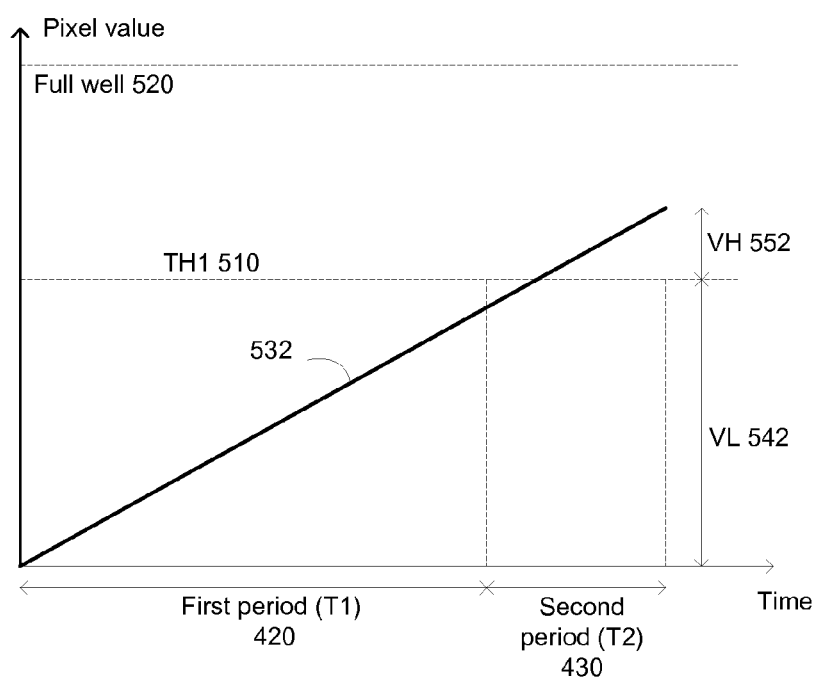
Figure 7C:
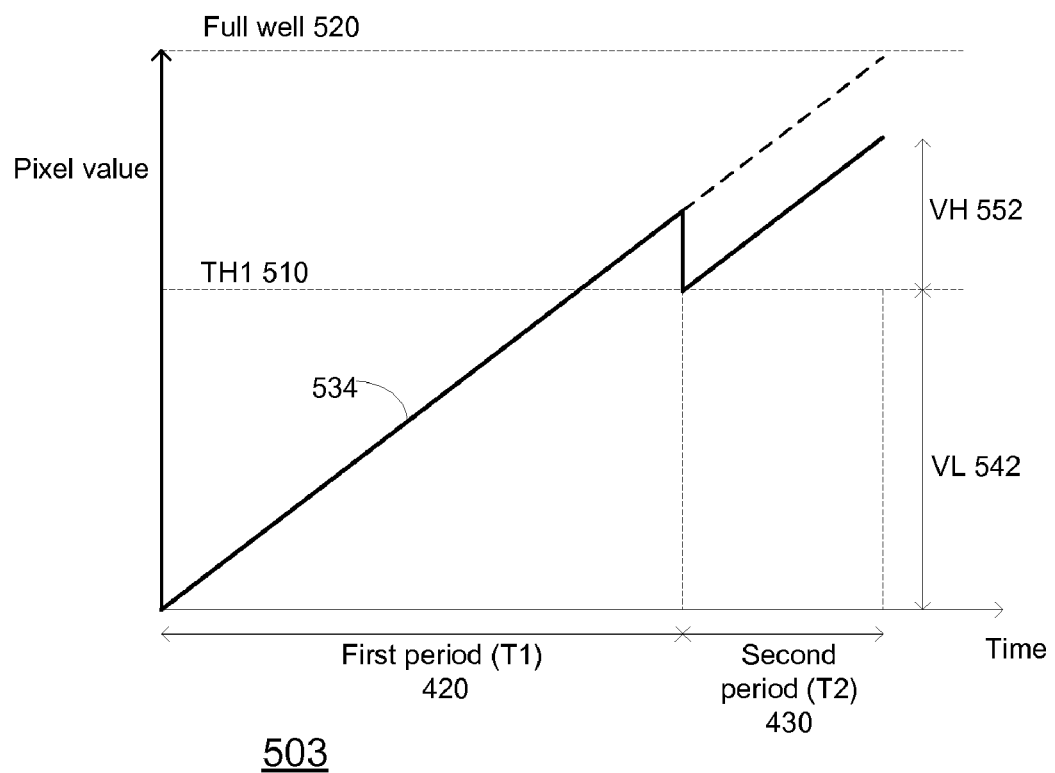

FIGS. 7A-7C illustrate the relationship between pixel values and integration time. It is assumed that a pixel value can range between zero and a full well range 520.

The intensity of light is assumed to be constant during first exposure period 420 and during second exposure period 430. It is further assumed that there is a linear relationship between the pixel value and the integration time. The intensity of light determines the slope of the curves that represent the relationship between the pixel value and integration time.

If the intensity of light exceeds a certain value (determined by the relationship between the aggregate length (T1+T2) of the first and second exposure periods 420 and 430 and between the full well 250) then the pixel value at the end of the second exposure period will not reflect that intensity. In other words, the pixel value will be clipped by full well value 250.

A first threshold (TH1) 510 is defined. The difference (at the end of the second exposure period) between the value of the pixel and the first threshold is denoted VH 552. If the value of the pixel is below the first threshold at the end of the second exposure period then it is denoted VL, else VL equals TH1 510.

FIG. 7C illustrates a clipping of the pixel value, at the end of first exposure period 410, if the pixel value exceeds TH1 510.

Double Write Back Embodiment

Figure 1:
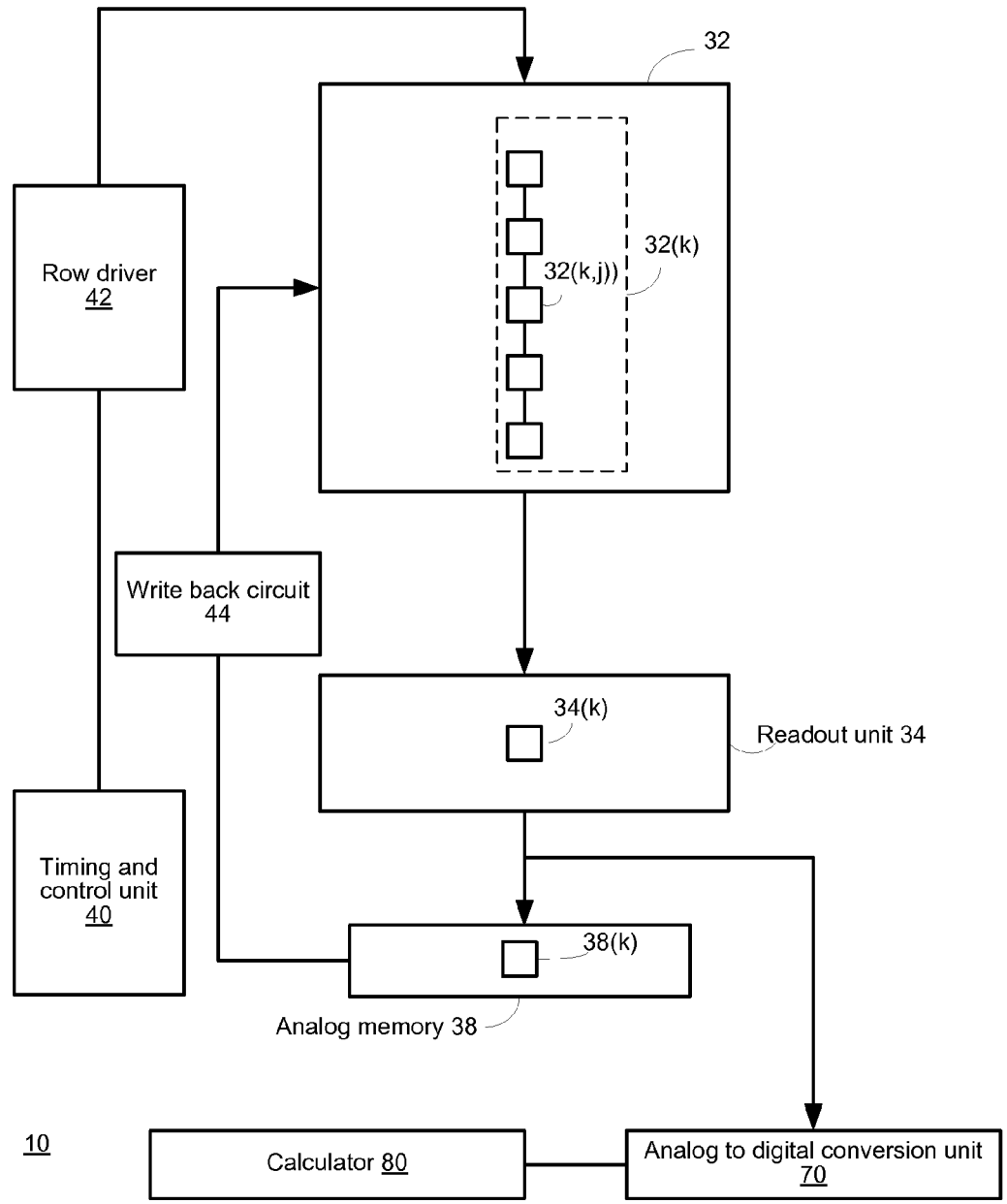

FIG. 1 illustrates device 10 according to an embodiment of the invention.

Device 10 includes pixel array 32, write back circuit 44, timing and control unit 40, readout unit 34, analog memory 38, analog to digital conversion unit 70 and row driver 42. FIG. 1 also illustrates calculator 80. Calculator 80 can be connected to device 10 or belong to device 10. Accordingly, device 10 can output a digital detection signal that represents the light that impinged onto a pixel during two exposure periods or can output digital signals that are sent to calculator 80. Calculator 80 can be connected to a display, a memory unit or an image processor in order to store or display an image captured by pixel array 32.

Pixel array 32 is connected to row driver 42 and to write back circuit 44. Write back circuit 44 is also connected to analog memory 38. Readout circuit 34 is connected to analog memory 42 and to analog to digital converter 70. Analog memory 42 is connected to pixel array 32.

Readout unit 34, write back circuit 44 and analog memory 42 form an analog feedback circuit. An analog signal can be read from a pixel, stored in an analog memory cell and written back to the pixel.

According to an embodiment of the invention each pixel column (such as pixel column 32(k)) is connected to a column readout circuit (such as 34(k)) that in turn is connected to an analog memory cell (such as analog memory cell 42(k)) and to a column write back circuit (such as column write back circuit 44(k)).

According to an embodiment of the invention the dynamic range of a pixel can be expanded by performing two writeback operations and two readout operations that follow two exposure periods 420 and 430.

The following explanation will refer to a single pixel such as pixel 32(k,j). Conveniently, the pixels of pixels array 32 are scanned, one row at a time.

Figure 6:
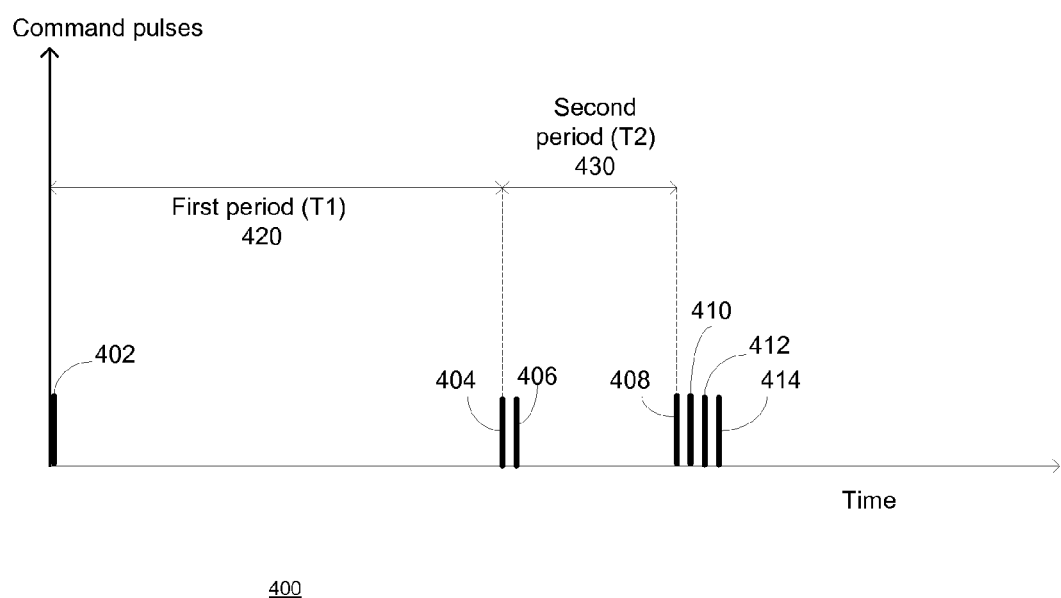
FIG. 6 is a timing diagram according to an embodiment of the invention.

FIG. 6 is a timing diagram 400 according to an embodiment of the invention. This timing diagram illustrates various command pulses that are generated during two exposure periods, two write back operations and two readout operations.

These command pulses are sent to various components of device 10, such as to pixel 32(j,k), to readout unit 34, write back circuit 44 and analog memory 38. These signals can be sent from timing and control unit 40. For simplicity of explanation row selection commands are not shown.

The first command pulse is a reset command pulse that resets pixel 32(k,j) as well as other pixels of the j'th pixel row. This reset command pulse is sent at the start of first exposure period 420. The length of first exposure period 420 is denoted T1. First exposure period 420 is longer than second exposure period 430. The length of second exposure period 430 is denoted T2.

At the end of first exposure period 420 pixel 32(k,j) generates a first signal responsive to light sensed by pixel 32(k,j) during first exposure period 420.

Once first exposure period 420 ends the analog feedback circuit (that includes readout unit 34 and analog memory 42) reads the first value (which is the first value of the first signal stored in pixel 32(k,j)) as illustrated by read command pulse 404 and writes back (as illustrated by write back command pulse 404) to pixel 32(k,j) a second value.

The second value of pixel 32(k,j) is responsive to the first value and to an analog writing process threshold that is characteristic of a writing of the second value.

The analog writing process threshold is an inherent limitation of the analog writing process. A pixel includes a photodiode that is connected to a transistor. The values that can be written via the transistor to the photodiode are limited by the threshold voltage of that transistor. For example, the analog writing process can write a value that is only a fraction of a full well value. The analog writing process threshold reflects this writing limitation.

Second exposure period 430 starts when first exposure period 420 ends. At the end of second exposure period 430 pixel 320(k,j) generates a third signal responsive to the second value and to light sensed by pixel 32(k,j) during second exposure period 430. The third signal has a third value.

After second exposure period 430 ends, column readout circuit 34(k) reads the third value, and writes the third value to analog memory cell 38(k). Column write back circuit 44(k) writes a fourth value to the pixel. The fourth value is responsive to the third value and to the analog writing process threshold. This is illustrated by readout command pulse 408 and by write back command pulse 410.

The fourth value is read from the pixel. This is illustrated by readout command pulse 412.

Conveniently, an anti-blooming pulse can follow the readout command pulse. The anti-blooming process involves writing to the pixel a high value (almost full well). Conveniently, the anti blooming process is applied for all the pixels in the array at once. This differs from the read/write back process that is applied one row after the other. Anti-blooming command pulse 414 triggers the anti-blooming process.

The third and fourth values are sent to analog to digital conversion unit 70 that generates digital representations of the third and fourth values.

Calculator 70 receives the analog representation of the fourth and third values and calculates a digital detection signal in response to a value of the third value and in response to the fourth value.

Conveniently, the digital detection signal equals the maximal value out of: (i) the third value, (ii) a difference between the third value and the fourth value being multiplied by a timing coefficient representative of a relationship between an aggregate length of the first and second exposure periods (T1+T2) and a length (T2) of the second exposure period.

In mathematical terms: Digital Detection Signal=MAX (V3, (V3−V4)*(T1+T2)/T2). Wherein MAX represents a find maximal value operation, V3 and V4 are the third and fourth values accordingly.

According to an embodiment of the invention a device that can perform both dynamic range expansion and motion compensation is provided.

The mapping between the values illustrated in FIGS. 6A-6C and between the third and fourth values is simple: the fourth value (V4) equals VL while the third value (V3) is the sum of VH and VL at the end of the second exposure period.

Figure 3:
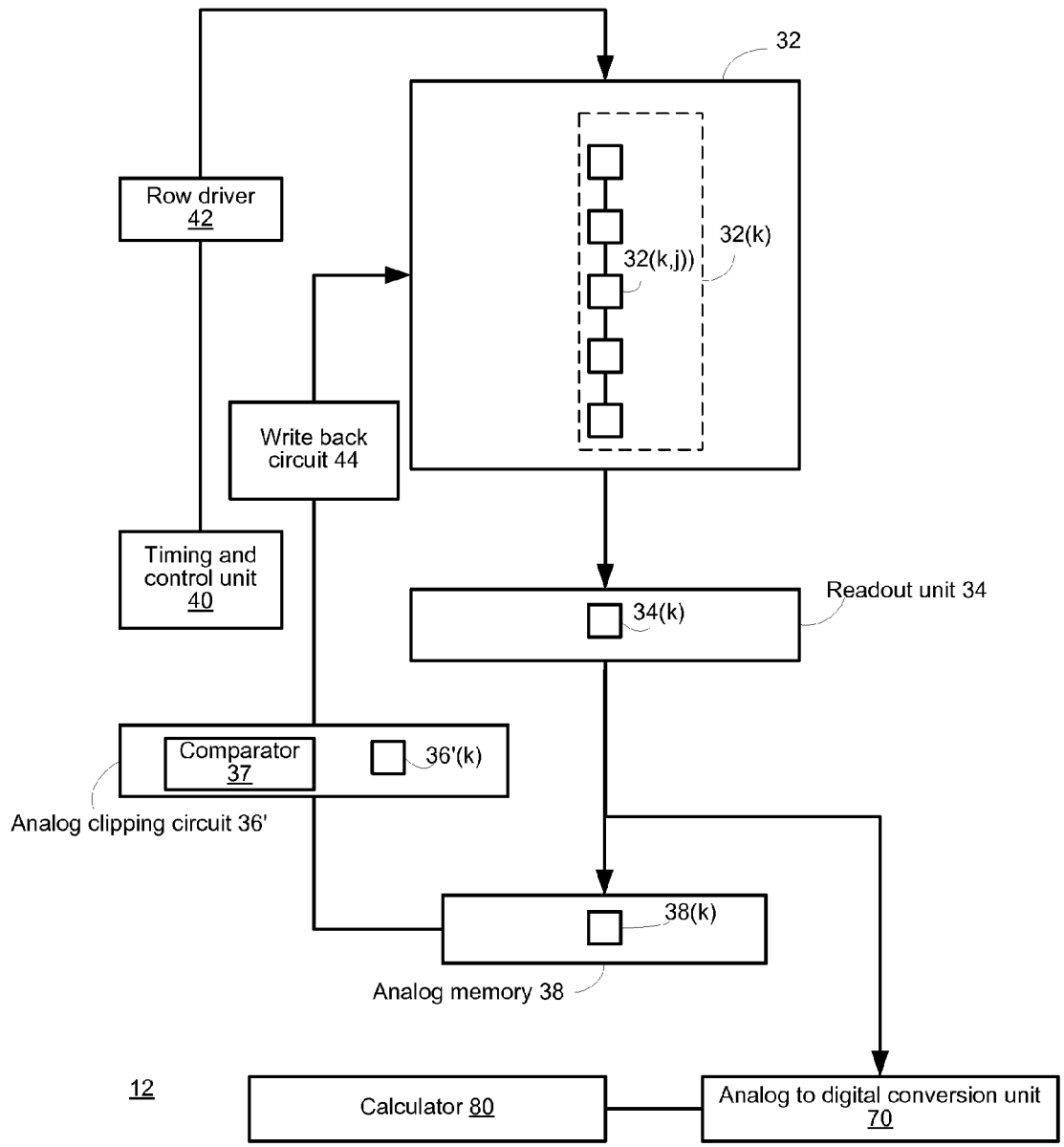
Figure 4:
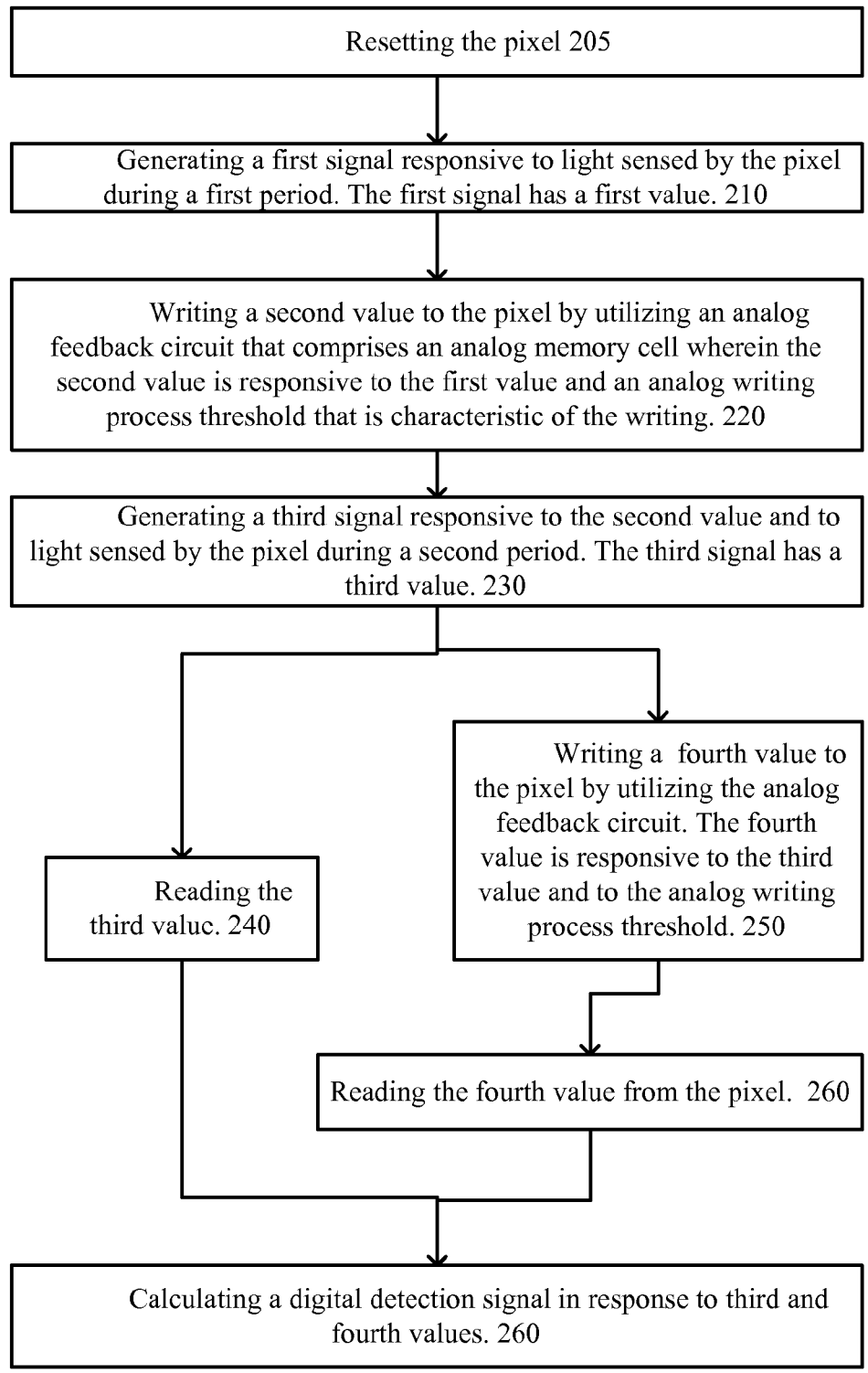
FIGS. 4 and 5 are flow chart illustrating methods for reading a pixel, according to various embodiments of the invention.

FIG. 3 illustrates method 200 for reading a pixel, according to an embodiment of the invention.

Method 200 starts by stage 205 of resetting the pixel.

Stage 205 is followed by stage 210 of generating a first signal responsive to light sensed by the pixel during a first exposure period. The first signal has a first value.

Stage 210 is followed by stage 220 of writing a second value to the pixel by utilizing an analog feedback circuit that includes an analog memory cell. The second value is responsive to the first value and to an analog writing process threshold that is characteristic of the writing.

Stage 220 is followed by stage 230 of generating a third signal responsive to the second value and to light sensed by the pixel during a second exposure period. The third signal has a third value.

Stage 230 is followed by stage 240 and 250. Stage 240 includes reading the third value.

Stage 250 includes writing a fourth value to the pixel by utilizing the analog feedback circuit. The fourth value is responsive to the third value and to the analog writing process threshold.

Stage 250 is followed by stage 260 of reading the fourth value from the pixel.

Stages 240 and 260 are followed by stage 270 of calculating a digital detection signal in response to the third value and the fourth value.

Conveniently, stage 220 includes: (i) writing the first value to an analog memory cell; (ii) reading the first value from the analog memory cell; and (iii) writing the second value to the pixel.

Conveniently, stage 270 includes finding a maximal value out of: (i) a sum of the third and fourth values; and (ii) a product of: (a) a difference between the third value and the fourth value, and (b) a timing coefficient representative of a relationship between an aggregate length of the first and second exposure periods and a length of the second exposure period.

According to an embodiment of the invention multiple pixels are arranged in a two dimensional array of pixels. A pixel column is coupled to a single analog memory cell. Multiple digital detection signals are calculated in parallel for multiple pixels that form a row of pixels. Multiple detection signals are calculated in a serial manner for pixels that form a pixel column.

Comparison Based Embodiment

Figure 2:
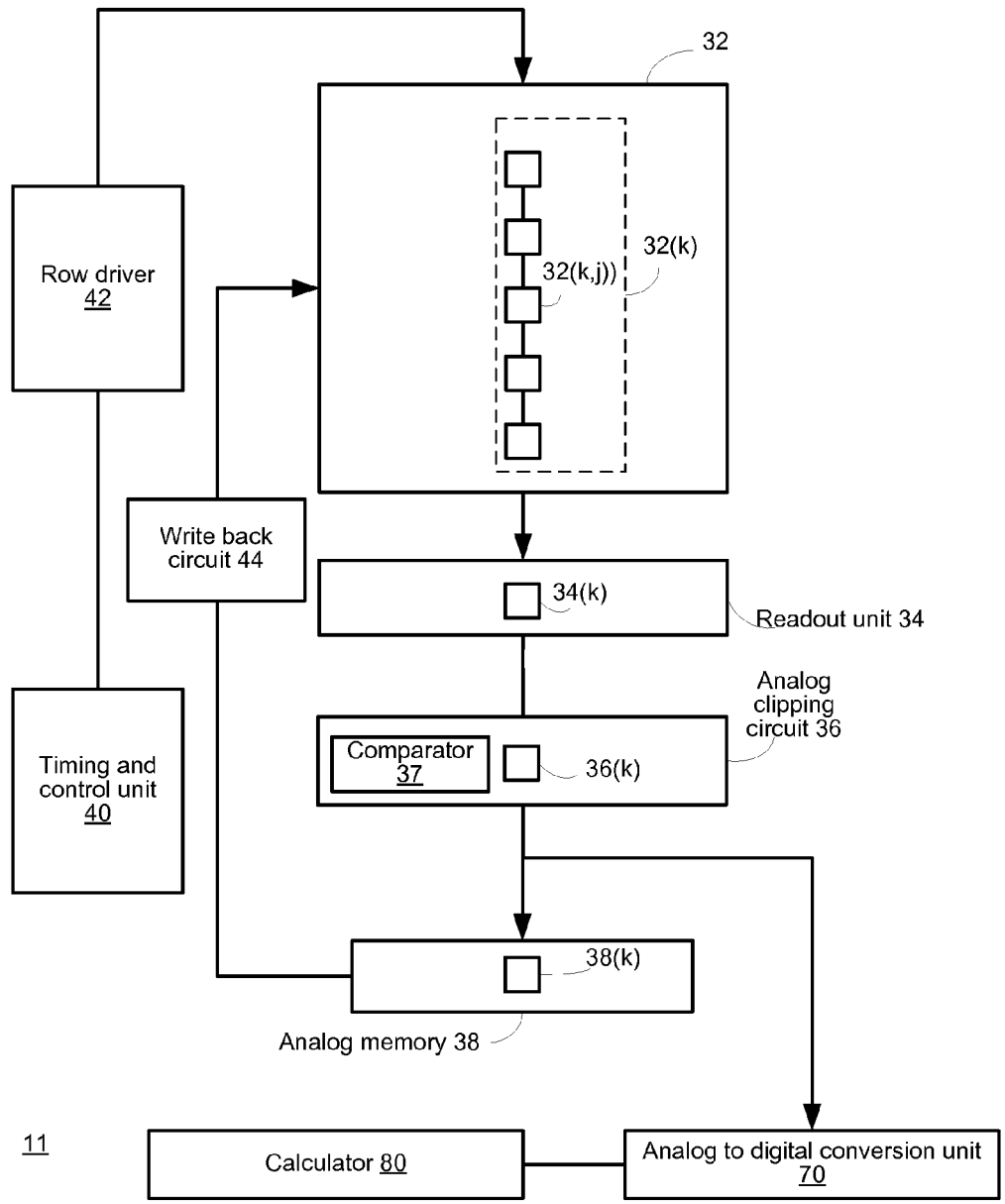

FIG. 2 illustrates device 11 according to an embodiment of the invention.

Device 11 of FIG. 2 differs from device 10, among other things, by including an analog clipping circuit 36 that includes comparator 37.

Analog clipping circuit 36 is located between readout circuit 34 and analog memory. It compares (by analog comparator 37) between a value of a pixel and a first threshold and if the value of the pixel exceeds the first threshold it clips the analog signal to that first threshold.

The clipping process avoids pixels mismatch problems by using the same analog clipping circuit (and analog memory cell) to the whole pixel column. The clipping characteristics of each analog clipping circuit can be measured and the whole pixel reading process can be calibrated.

The following explanation will refer to a single pixel such as pixel $32(k,j)$. Conveniently, the pixels of pixels array 32 are scanned, one row at a time.

A pixel, such as pixel $32(k,j)$ generates a first signal responsive to light sensed by the pixel during a first exposure period. The first signal has a first value. The first value is read by column readout circuit $34(k)$ and is sent to column analog clipping circuit $36(k)$. Analog comparator $37(k)$ within column analog clipping circuit $36(k)$ compares the first value to a first threshold. If the first value exceeds the first threshold then a second value that equals the first threshold is stored in analog memory cell $38(k)$. Else, a second value that equals the first value is written to analog memory cell $38(k)$.

Pixel $32(k,j)$ generates a third signal responsive to the second value and to light sensed by the pixel during a second exposure period. The third signal has a third value. Column readout circuit $34(k)$ reads the third value and this third value is sent to analog to digital conversion unit 70.

Calculator 80 calculates a digital detection signal in response to the third value and in response to the first threshold.

FIG. 3 illustrates device 12 according to an embodiment of the invention.

The following explanation will refer to a single pixel such as pixel $32(k,j)$. Conveniently, the pixels of pixels array 32 are scanned, one row at a time.

Analog clipping circuit 36' of device 12 is located between write back circuit 44 and analog memory 38, while analog clipping circuit 36 of device 11 is located between readout circuit 34 and analog memory 38.

Column analog clipping circuit 36'(k) compares (by analog comparator $37(k)$) between a value of pixel $32(k,j)$ (stored in analog memory cell $38(k)$) and a first threshold. If the value of the pixel exceeds the first threshold it clips the analog signal to that first threshold.

The clipping process avoids pixels mismatch problems by using the same analog clipping circuit (and analog memory cell) to the whole pixel column. The clipping characteristics of each analog clipping circuit can be measured and the whole pixel reading process can be calibrated.

A pixel, such as pixel $32(k,j)$ generates a first signal responsive to light sensed by pixel $32(k,j)$ during first exposure period 420. The first signal has a first value. The first value is read by readout unit 34, and especially by column readout circuit $34(k)$ and is sent to analog memory cell 38. During a write-back operation analog clipping circuit clips the first value stored in analog memory cell 36'(k) to provide a second value that is written to pixel $36(k,j)$.

Analog comparator 37 within analog clipping circuit 36' compares the first value to a first threshold. If the first value exceeds the first threshold then a second value that equals the first threshold is written back to pixel 32(k,j) by column write back circuit 44(k). Else, a second value that equals the first value is written to the pixel.

Pixel 32(k,j) generates a third signal responsive to the second value and to light sensed by the pixel during a second exposure period. The third signal has a third value. Column readout circuit 34(k) reads the third value and sends it to analog to digital conversion unit 70.

Calculator 80 calculates a digital detection signal in response to the third value and the first threshold.

Figure 5:
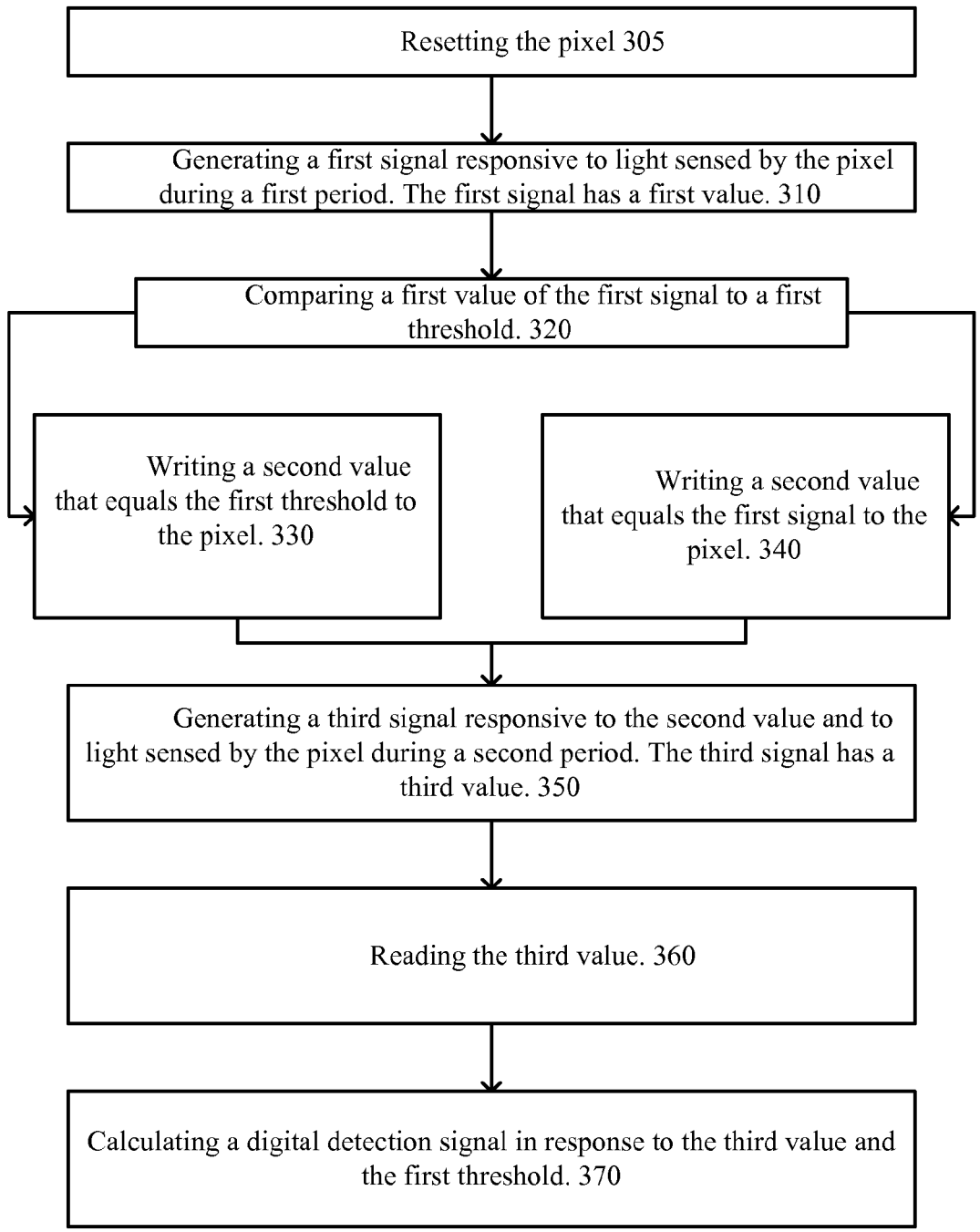

FIG. 5 illustrates method 300 for reading a pixel according to an embodiment of the invention.

Method 300 starts by stage 305 of resetting the pixel. Stage 305 is followed by stage 310 of generating a first signal responsive to light sensed by the pixel during a first exposure period. The first signal has a first value.

Stage 310 is followed by stage 320 of comparing a first threshold to the first value.

Stage 320 is followed by stage 330 and 340 that involve writing a second value to the pixel. If the first value exceeds the first threshold then stage 320 is followed by stage 330 of writing a second value that equals the first threshold to the pixel. If the first value is below the first threshold then stage 320 is followed by stage 340 of writing a second value that equals the first value to the pixel.

Stages 330 and 340 are followed by stage 350 of generating a third signal responsive to the second value and to light sensed by the pixel during a second exposure period. The third signal has a third value.

Stage 350 is followed by stage 360 of reading the third value.

Stage 360 is followed by stage 370 of calculating a digital detection signal in response to the third value and the first threshold.

According to an embodiment of the invention stage 310 is followed by stage 315 of storing the first value in an analog memory cell. Stage 330 and 340 includes providing the first value to an analog clipping circuit.

According to another embodiment of the invention stage 310 is followed by stage 318 of providing the first value to an analog clipping circuit, and by stage 319 of writing the second value to the analog memory cell by the analog clipping circuit.

Analog Clipping Circuits

FIGS. 8-11 illustrate analog clipping circuits 36 and 36' according to various embodiments of the invention.

Figure 8:
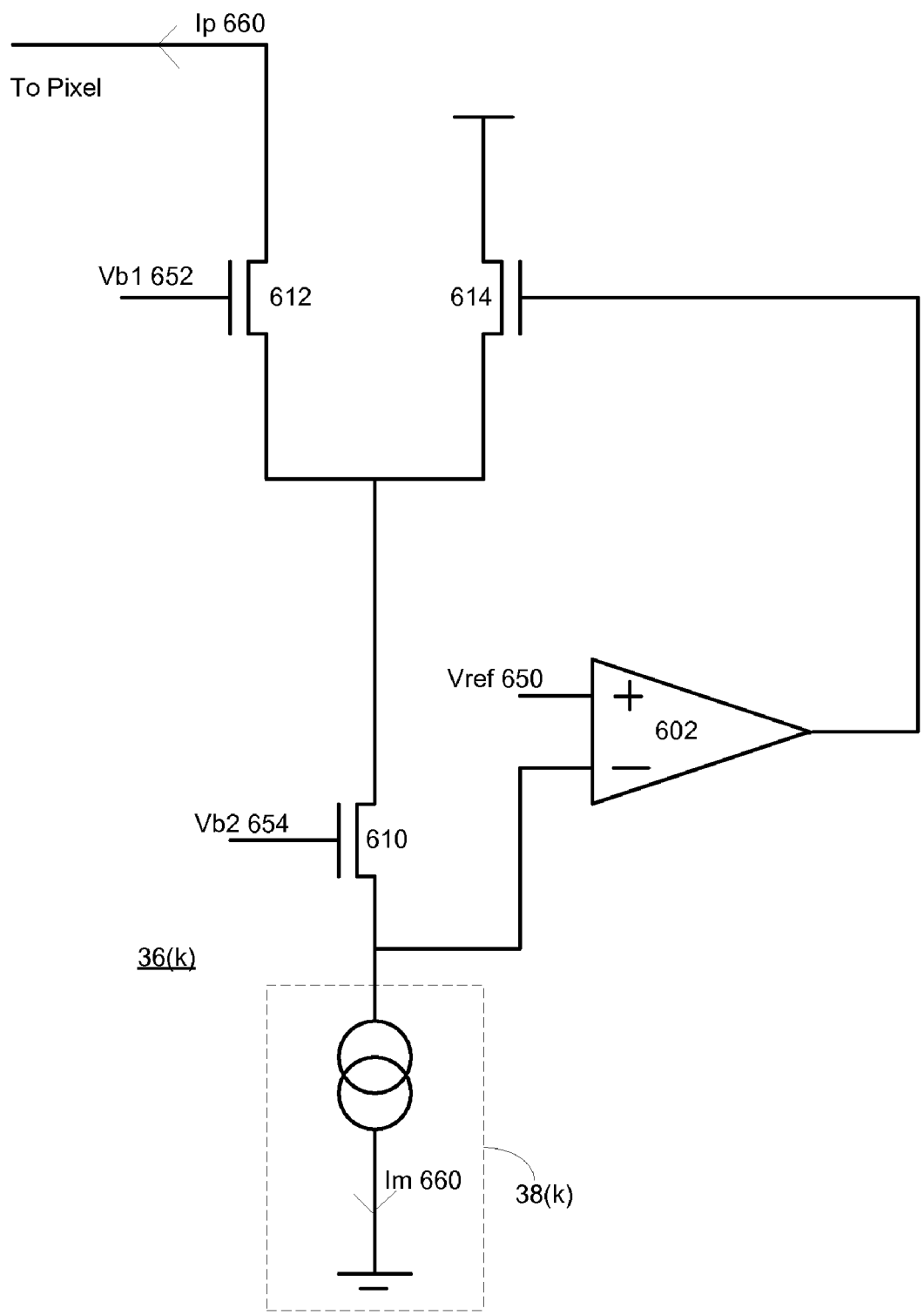
FIGS. 8-11 illustrate analog clipping circuits according to various embodiments of the invention.
Figure 9:
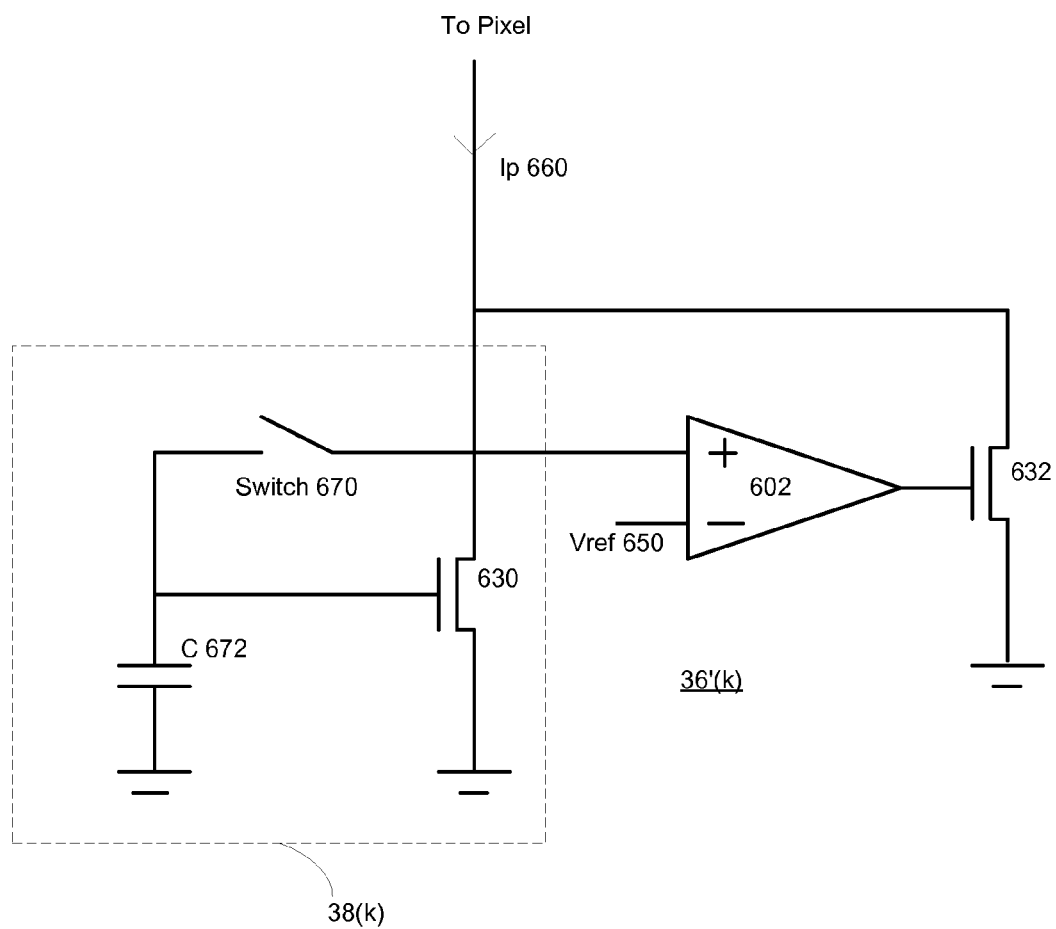
Figure 10:
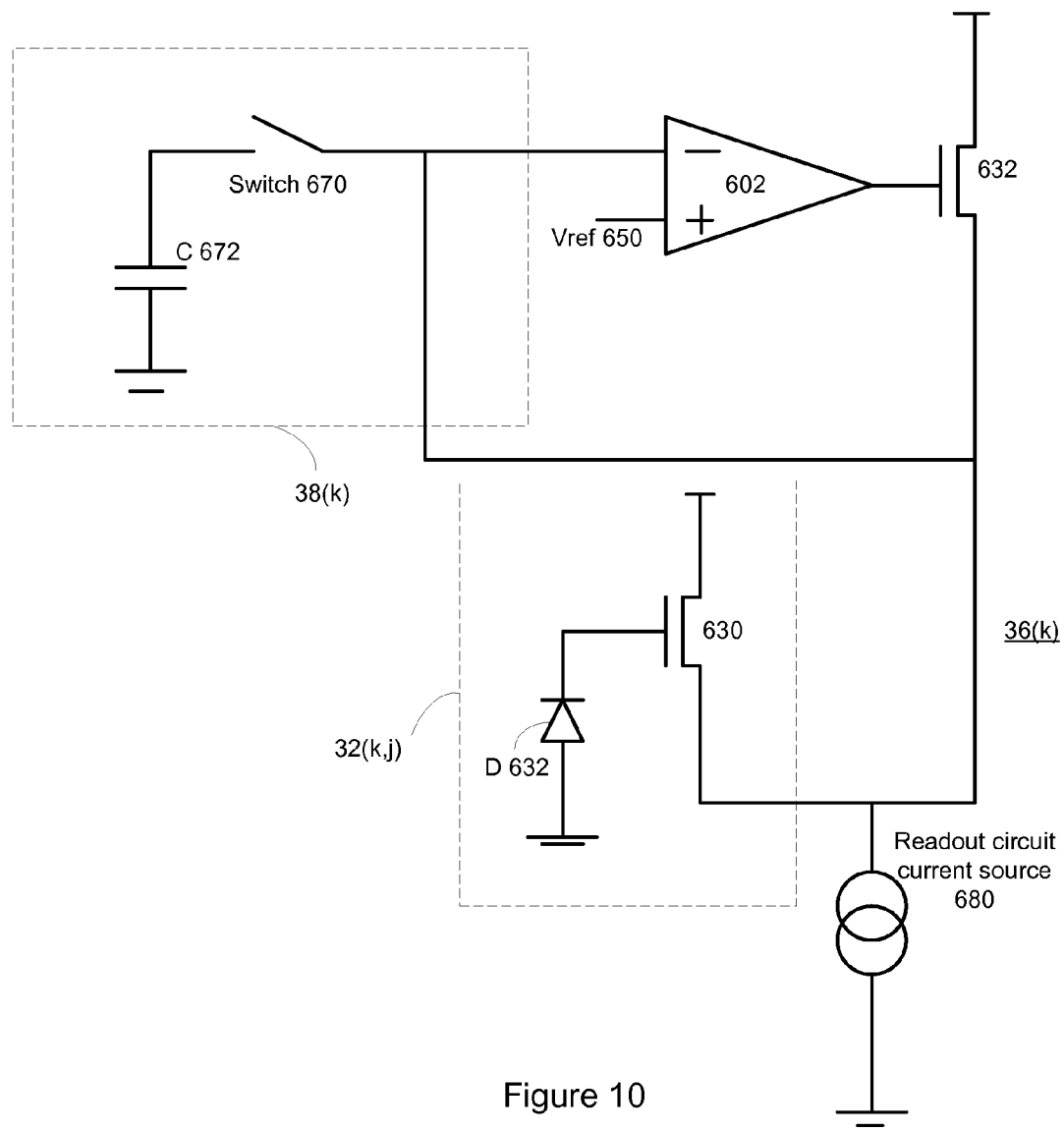
Figure 11:
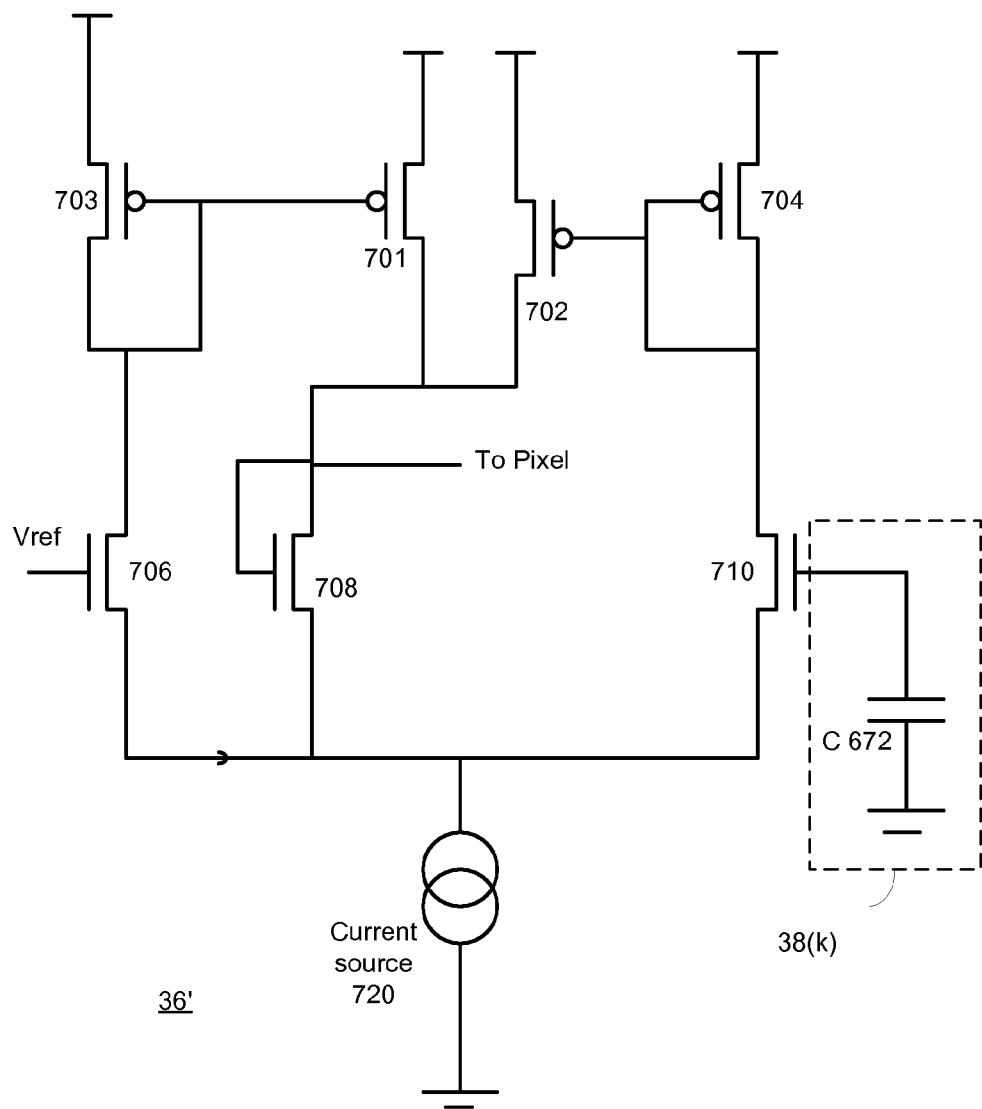

FIG. 8 illustrates analog memory cell 38(k) and analog clipping circuit 36' that operate in a current mode and clip an analog value stored in an analog memory cell before than analog value is written back to the pixel. FIG. 9 illustrates analog memory cell 38(k) and analog clipping circuit 36 that operate in a current mode and clip an analog value before being stored in analog memory cell 38(k). FIG. 10 illustrates analog memory cell 38(k) and analog clipping circuit 36' that operate in a voltage mode and clip an analog value before being stored in analog memory cell 38(k). FIG. 11 illustrates analog memory cell 38(k) and analog clipping circuit 36 that operate in a voltage mode and clip an analog value stored in an analog memory cell before the analog value is written back to the pixel.

Referring to FIG. 8, analog memory cell 38(k) is represented by a current source through which current Im 660 flows. Analog memory cell 38(k) is connected to the source of first transistor 610. The gate of first transistor 610 receives a bias voltage Vb2 654. The drain of first transistor 610 is connected to the sources of second and third transistors 612 and T 614. The gate of third transistor 614 is connected to an output of operational amplifier 602. The gate of second transistor 612 is connected to another bias voltage Vb1 652. The drain of third transistor is connected to a voltage supply. The drain of second transistor 612 is connected to a pixel that drains a pixel current Ip 660. A non-inverting input of operational amplifier 602 receives reference voltage Vref 650. The inverting input of operational amplifier 602 is connected to the source of first transistor 610.

If the current stored in analog memory cell 38(k) increases the source voltage of first transistor 610 decreases. If the source voltage is below reference voltage Vref 650 then the operational amplifier opens third transistor 614. Third transistor 614 drains some of the current that is supplied by analog memory cell 38(k). If the current stored in analog memory cell 38(k) is lower than a reference threshold that corresponds to a source voltage that is below Vref 650 then third transistor 614 is closed and the pixel current can substantially equal the current supplied by analog memory cell 38(k).

Referring to FIG. 9, analog memory cell 38(k) is represented by capacitor 672, first transistor 630 and switch 670. The gate of first transistor 630 is connected to one end of capacitor 672. The other end of capacitor 672 and the source of first transistor 630 are grounded. Switch 670 is connected between the gate and drain of first transistor 630. The drain of first transistor 630 is also connected to a noninverting input of operational amplifier 602. The gate of second transistor 632 is connected to an output of operational amplifier 602. The source of second transistor 632 is grounded. The drain of second transistor 632 is connected to the drain of first transistor 630 and to the pixel.

A non-inverting input of operational amplifier 602 is connected to switch 670 such as to receive a sampled voltage from capacitor 672 when switch 672 is closed. The inverting input of operational amplifier 602 receives reference voltage Vref 650.

The current that can charge capacitor 672 can equal the pixel current if second transistor 632 is closed. By opening second transistor 632 (if the pixel current exceeds a threshold that corresponds to Vref 650) the pixel value stored in analog memory cell 38(k) is clipped.

Referring to FIG. 10, analog memory cell 38(k) is represented by capacitor 672 that is serially connected to an end of switch 670. The other end of switch 670 is connected to an inverting input of operational amplifier 602, to a source of second transistor 632, to a source of first transistor 630 that belongs to pixel 32(k,j) and to a readout circuit current source 680. The non-inverting input of operational amplifier 602 receives reference voltage Vref 650.

The gate of second transistor 632 is connected to an output of operational amplifier 602. The gate of first transistor 630 is connected to an end of photodiode 632. The other end of photodiode 632 is grounded.

This analog clipping circuit 36 limits the value that can be written to analog memory cell 38(k). If the pixel value exceeds a certain threshold (responsive to Vref 650) then second transistor 632 is opened and some of the current that should have charged the capacitor 672 flows through second transistor 632.

Referring to FIG. 11, analog memory cell 38(k) is represented by capacitor 672 that is connected to a gate of third NMOS transistor 710. The sources of first till third NMOS transistors 706, 708 and 710 are connected to a current source 720. The gate of first NMOS transistor 706 receives reference voltage Vref 650.

The drains of first till fourth PMOS transistor 703, 701, 702 and 704 are connected to a power supply. The gate and drain of second NMOS transistor 708, the sources of second and third PMOS transistors 701 and 702 are connected to a pixel.

The gate of first PMOS transistor 703 is connected to the gate of second PMOS transistor 701, to the source of first PMOS transistor 703 and to the drain of first NMOS transistor 706.

The gate of third PMOS transistor 702 is connected to the gate of fourth PMOS transistor 704, to the source of fourth PMOS transistor 704 and to the drain of third NMOS transistor 710.

The analog clipping circuit clips the voltage signal that can be written to the pixel. If the gate voltage of third NMOS transistor 710 (which is the voltage drop over capacitor 672) exceeds Vref then third NMOS transistor conducts and first NMOS transistor is cut off thereby causing the transistors 702, 704, 710 and 708 to operate as a unit amplifier that causes the voltage sent to the pixel to substantially equal the voltage drop over capacitor 672.

Write Back for Motion Compensation Embodiment

According to an embodiment of the invention the device is also capable of performing a write back for compensating between inter-frame motion. The compensation can be applied for exposure periods that are usually much longer than first and second exposure periods 420 and 430.

FIG. 12 is a schematic diagram of a device 14 according to an embodiment of the invention.

Device 14 differs from device 10 of FIG. 1 by including a picture movement detection unit 42 and a picture shift unit 46. Picture shift unit 46 may include an analog memory or may be connected to an analog memory. FIG. 12 illustrates a picture shift unit 36 that includes analog memory 38.

Picture movement detection unit 42 is capable of estimating the relative movement between pixel array 32 and at least one object within the image acquired by pixel array 32. Picture movement detection unit 42 can apply well-known algorithms for determining that movement. Conveniently, picture movement detection unit 42 receives multiple output signals of the device 14, usually multiple images and processes them to determine previous movement and estimate future movement. Picture movement detection unit 42 can determine the direction of that movement and its speed. Conveniently, the estimated movement is translated to an X axis and Y axis estimated movement components. These components are used to compensate for camera shake by determining which pixels shall receive the analog signal generated by other pixels.

The pixel array 32 is controlled such as to provide multiple intermediate images. Once a certain intermediate image is acquired it (or portions of said intermediate image) is sent to picture shift unit 46, via readout unit 34, to be temporarily stored and to be provided (conveniently during a write-back stage) to pixels in a manner that is responsive to the estimated movement.

Device 14 facilitates long aggregate integration periods that include multiple short intermediate exposure periods. By shifting analog signals representative of pervious intermediate images the device 14 allows to provide sharp images even in low ambient light conditions.

Pixel array 32 includes multiple pixels. These pixels can be prior art pixels, such as those illustrated by the previously mentioned patents, but this is not necessarily so. For example, a pixel can include a light sensitive element (such as a photodiode, photo-gate or a phototransistor) that generates an analog signal in response to received light, as well as additional components, connected to the light sensitive element, that read that analog signal (for example by sensing voltage, current and the like) and send it to other components such as readout unit 34. The pixel is also capable to receive analog signals representative of a previous intermediate exposure period. These signals may be also referred to as write-back signals and the process of providing these signals to the pixels may be also referred to as a write-back process. Each write-back operation integrates new light information with previously acquired information resulting in an overall long aggregate integration period. The reception of a write back signal alters a condition of the pixel and especially a condition of the light sensitive element such as to reflect previous reception of light from other pixels.

Picture shift unit 46 stores analog signals that represent the light received by the pixels, shifts it according to the estimated motion (also referred to inter-image shift) and sends it, either directly or via the readout unit 34, back to the pixel array 32.

The analog memory components usually include two or more rows of memory cells. The amount of rows determines that amount of Y-axis movement compensation. The amount of rows can also be responsive to the configuration of the pixel array. A color pixel array usually requires more rows that a single light pixel array.

A typical color pixel array configuration includes a grid of color filters that are placed in a mosaic pattern over the pixels so that only one of red, green or blue light reaches any given pixel. The most common color filter pattern used in single pixel array cameras is the Bayer pattern. In this pattern the pixel array includes 50% green pixels, 25% red pixels and 25% blue pixels. The pixels are arranged such that one row include green pixels, each positioned between red pixels while an adjacent row includes green pixels, each positioned between blue pixels.

Write-back operations occur between pixels of the same color. Accordingly, using a color pixel array requires at least one additional row of memory cells in comparison to a single color pixel array.

Those skilled in the art will readily appreciate that various modifications and changes can be applied to the embodiments of the invention as hereinbefore described without departing from its scope defined in and by the appended claims.

We claim:

1. A method for reading a pixel, the method comprises:
generating a first signal responsive to light sensed by the pixel during a first exposure period;
writing a second value to the pixel by utilizing an analog feedback circuit that comprises an analog memory cell; wherein the second value is responsive to a value of the first signal, to an analog writing process threshold that is characteristic of the writing and to a first threshold;
generating a third signal responsive to the second value and to light sensed by the pixel during a second exposure period;
reading a third value of the third signal;
writing a fourth value to the pixel by utilizing the analog feedback circuit; wherein the fourth value is responsive to third value, to the analog writing process threshold and to the first threshold;
reading the fourth value; and
calculating a digital detection signal in response to the third value and in response to the fourth value; wherein the first threshold does not exceed a product of a full well value multiplied by a ratio between a length of the first exposure period and an aggregate length of the first and second exposure periods.

2. The method according to claim 1 wherein the stage of writing the second value comprises:
    writing the first value to an analog memory cell;
    reading the first value from the analog memory cell; and
    writing the second value to the pixel.

3. The method according to claim 1 wherein the calculating comprises defining the digital detection signal as a maximal value out of: (i) a sum of the third and fourth values; and (ii) a product of: (a) a difference between the third value and the fourth value, and (b) a timing coefficient representative of a relationship between an aggregate length of the first and second exposure periods and a length of the second exposure period.

4. The method according to claim 1 wherein multiple pixels are arranged in a two dimensional array of pixels; wherein pixel column is coupled to a single analog memory cell; wherein multiple digital detection signals are calculated in parallel for multiple pixels that form a row of pixels; and wherein multiple detection signals are calculated in a serial manner for pixels that form a pixel column.

5. A device, comprising a pixel, a readout circuit and an analog feedback circuit; wherein the analog feedback circuit comprises an analog memory cell;
    wherein the pixel generates a first signal responsive to light sensed by the pixel during a first exposure period;
    wherein the analog feedback circuit writes a second value to the pixel; wherein the second value is responsive to a first value of the first signal, to an analog writing process threshold that is characteristic of a writing of the second value and to a first threshold;
    wherein the pixel generates a third signal responsive to the second value and to light sensed by the pixel during a second exposure period;
    wherein the readout circuit reads a third value of the third signal;
    wherein the analog feedback circuits writes a fourth value to the pixel; wherein the fourth value is responsive to the third value, to the analog writing process threshold and to the first threshold;
    wherein the readout circuits reads the fourth value; and
    wherein a calculator coupled to the readout circuit calculates a digital detection signal in response to the third value and to the fourth value; wherein the first threshold does not exceed a product of a full well value multiplied by a ratio between a length of the first exposure period and an aggregate length of the first and second exposure periods.

6. The device according to claim 5 wherein the analog memory cell stores the first value and wherein the first value is clipped during a write operation to the pixel.

7. The device according to claim 5 wherein the calculator is adapted to define the digital detection signal as a maximal value out of: (i) a sum of the third and fourth values; and (ii) a product of: (a) a difference between the third value and the fourth value, and (b) a timing coefficient representative of a relationship between an aggregate length of the first and second exposure periods and a length of the second exposure period.

8. The device according to claim 5 comprising multiple pixels that are arranged in a two dimensional array of pixels; wherein pixel column is coupled to a single analog memory cell; wherein the calculator calculates multiple digital detection signals in parallel for multiple pixels that form a row of pixels; and wherein the calculator calculates in a serial manner multiple detection signals for pixels that form a pixel column.

9. The method according to claim 4, comprising sending an anti-blooming signal of a value that is proximate to the full well value to all of the multiple pixels.

* * * * *